Aug. 22, 1967　　　A. J. GODSHALK　　　3,337,083
CLOSURE ARRANGEMENT FOR CONTAINER
Filed Sept. 28, 1965　　　2 Sheets-Sheet 2
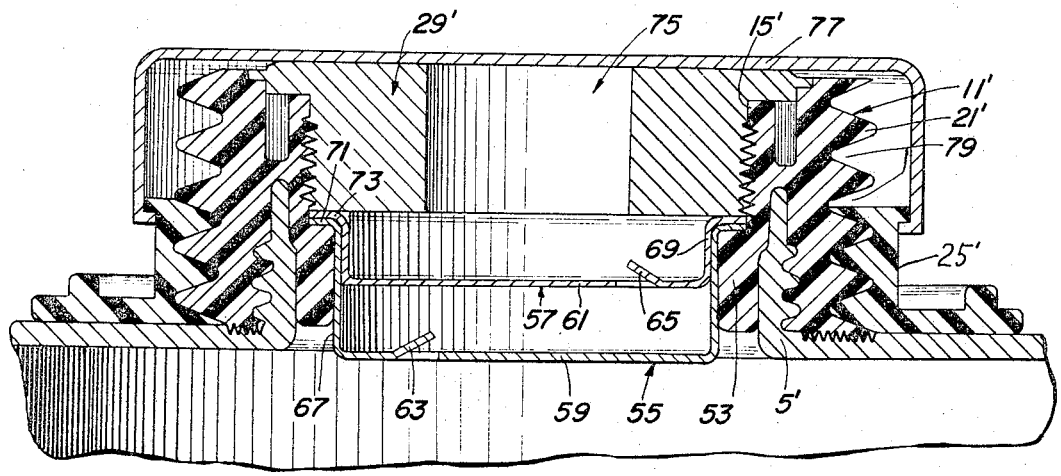
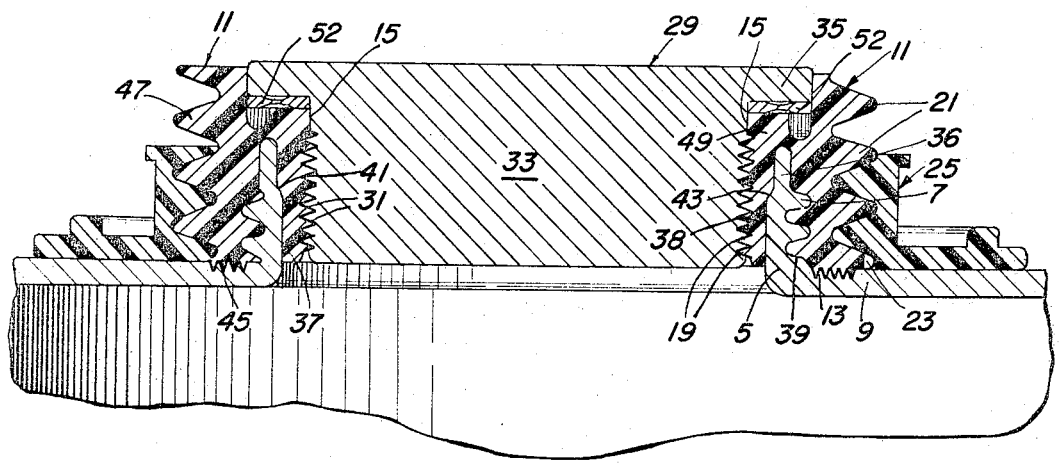
INVENTOR
ALVA J. GODSHALK United States Patent Office 3,337,083
Patented Aug. 22, 1967

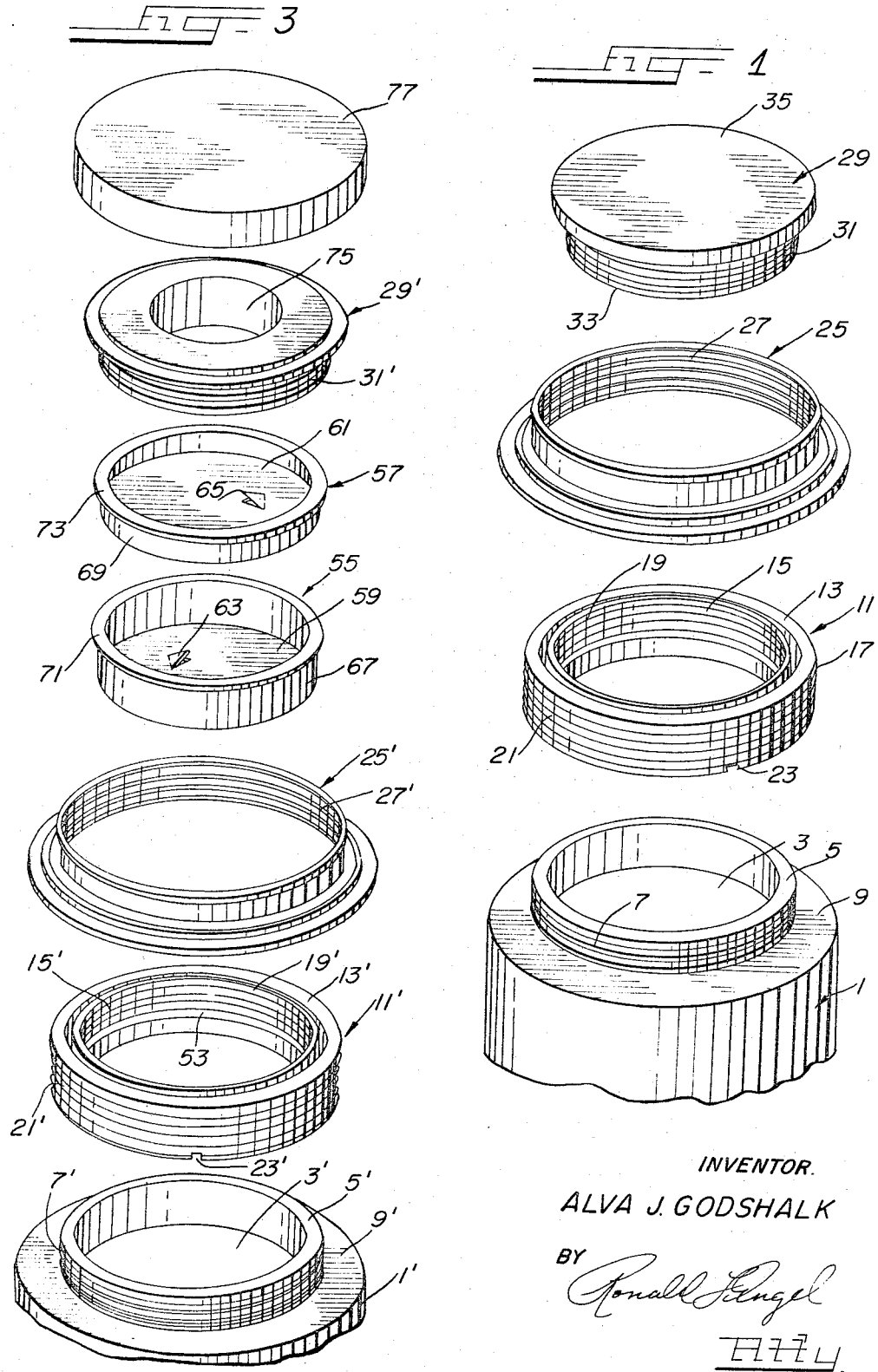

3,337,083
CLOSURE ARRANGEMENT FOR CONTAINER
Alva J. Godshalk, Homewood, Ill., assignor to Bennett Industries, Inc., Peotone, Ill., a corporation of Illinois
Filed Sept. 28, 1965, Ser. No. 490,891
12 Claims. (Cl. 220—39)

This invention relates generally to a closure arrangement for a container and, more particularly, to a closure arrangement including an injection molded neck ring that is cold flow welded to a flange on a plastic drum.

In the formation of plastic (such as polyethylene) containers, especially those of the larger drum type, a process such as blow molding or rotation casting is usually employed. Plastic container formation, by processes exemplified by blow molding and rotation casting, is relatively simple and inexpensive, but the finished product tends to be soft and incapable of accurately maintaining precise details. This means that, if a flange of the container produced by one of these processes is provided with internal threads to support a closure plug, the arrangement is not satisfactory because the blow molding or rotation casting type of process does not yield an end product sufficiently hard to permit the accurate formation of closely aligned threads. Also, the softness of a plastic container formed by one of these processes prevents accurate resealing by the closure plug after a number of removals, due to reshaping of the plug support area. Further, the softness of the closure plug support threads greatly diminishes the useful life of the closure arrangement. The difficulties in obtaining a suitable threaded closure, inherent in plastic containers formed by a blow molding or rotation casting type of process, may be obviated by the use of an injection molded closure arrangement of the type disclosed herein. Injection molded plastic is much harder than blow molded or rotationally cast plastic and may be more accurately threaded. These characteristics of the injection molded plastic provide a tighter seal for the plastic drum and a longer life for the closure arrangement.

Briefly, in a preferred embodiment described herein, the present invention provides an injection molded neck ring formed separately from the plastic container, which is produced by a blow molding or rotation casting type of process. While primarily useful in connection with plastic containers, it should be realized that the injection molded neck ring of this invention may also be used with other types of containers.

In the particular embodiments considered herein, a blow molded or rotation cast plastic container, or drum, is formed with a vertically extending flanged opening. The flange is provided with spiral threading on the outside surface thereof. An injection molded neck ring is formed in the shape of an annular member having a body portion, an inner surface, and an outer surface. An annular groove is formed in the body portion of the annular member to lockingly mate with the flange. Threads are formed in the outer side (the side having a greater diameter) of the annular groove to engage the threads on the flange. By applying the injection molded neck ring so that the groove and the flange are united under a relatively large torque and pressure, a cold flow weld is formed between the injection molded neck ring and the blow molded or rotation cast flange. A particularly good connection is formed as a result of the combination of the cold flow weld and the mechanical interlocking of the threads. The inner surface of the annular neck ring is provided with accurately formed threads to engage and support a threaded closure plug. Threads are also formed on the outer surface of the neck ring to engage the threads of an external closure or dispensing device. This external closure or dispensing device may be a dust cap, a pump, a spigot or any other closure or dispensing device useful in connection with a drum type container.

A further novel improvement, designed specifically for the packaging of highly volatile liquids, involves the formation of a projection on the inner surface of the neck ring below the threads formed thereon. This projection serves as a retaining member for the vertical support members of a pair of diaphragms. The vertical support member of one of the diaphragms is longer than that of the other diaphragm, so that the diaphragms are separated by a space when assembled. Each of the diaphragms is formed with a vent near the outer edge thereof, and the diaphragms are positioned relative to each other so that the vents are diametrically opposed from one another. An opening is formed through the center of the closure plug, and a dust cap is secured to threads formed on the outer surface of the neck ring. This arrangement permits the escape of gases when a certain pressure is exceeded, but effectively prevents the loss of any liquid for a period of time if the container is tipped over during shipment of the volatile substance.

Accordingly, a primary object of the present invention is to provide a new and unique closure arrangement that is especially adapted for plastic drum containers.

Another object of this invention is to provide a plastic closure neck ring characterized by accurate threading dimensions.

Another object of this invention is to provide a plastic closure neck ring that exhibits accurate resealing and a longer effective life.

Yet another object of this invention is to provide a plastic closure arrangement that permits the attachment of external devices, such as pumps and spigots, to an opening in a plastic drum.

A further object of this invention is to provide a unique double-diaphragm vented closure arrangement that is particularly suited for the packaging of highly volatile liquids.

These and other objects, advantages, and features of the subject invention will hereinafter appear, and, for purposes of illustration, but not of limitation, exemplary embodiments of the subject invention are shown in the appended drawings, in which:

FIGURE 1 is an exploded perspective view of one embodiment of this invention;

FIGURE 2 is a side plan view of the arrangement in FIGURE 1 in assembled form;

FIGURE 3 is an exploded perspective view of another embodiment of the subject invention; and FIGURE 4 is a side plan view of the arrangement of FIGURE 3 in assembled form.

In the perspective view of FIGURE 1, the elements that are utilized in the basic closure arrangement of this invention are shown individually. The container 1 is shown in the lower portion of FIGURE 1. This container 1 may be of any type or shape, but the subject invention has its greatest utility in connection with a drum-like plastic container conventionally formed by a blow molding or rotation casting type of process. The plastic involved in forming such a container may be any of the conventional plastics, such as polyethylene.

An opening 3 is provided in the top of container 1, and this opening is surrounded by a flange 5, which is provided with a spiral thread 7. The flange 5 is set in from the outer surface of container 1 by a shoulder 9. Shoulder 9 may be an integral part of container 1, or it may be a separate portion securely fastened to the container. Similarly, the flange 5 may be an integral part of shoulder 9 or a separate portion secured to the shoulder. In the particular case of blow molded or rotation cast plastic drums, flange 5 and shoulder 9 will be formed as an integral part of the container 1.

A neck ring 11 is illustrated in FIGURE 1 immediately above the container 1. The neck ring 11 is formed from plastic by an injection molding technique so that it is harder and may be more accurately threaded than a plastic device formed by a process such as blow molding or rotation casting. The neck ring 11 is formed with an annular body portion 13, an inner surface 15, and an outer surface 17. Inner surface 15 is provided with threads 19, while outer surface 17 is provided with threads 21. A groove (not shown in FIGURE 1 but hereinafter discussed in connection with FIGURE 2) is formed in the lower portion of the annular neck ring 11 to mate with flange 5 on container 1. The notch 23 (representative of a plurality of such notches) is located at the bottom of body portion 13 at outer surface 17 to provide a keyed interlock (as by utilizing a hot member to melt a portion of the plastic of shoulder 9 for positioning and solidification within notch 23 upon assembly).

A retaining ring 25 is shown in FIGURE 1 above neck ring 11. Retaining ring 25 has threads 27 formed on the inner surface thereof. Threads 27 are of a size and spacing to engage threads 21 on the outer surface 17 of neck ring 11. Retaining ring 25 is used only when the plastic container 1 is used in conjunction with an outer receptacle. This outer receptacle might be a conventional overpack container made from a material such as steel or a steel and fiber combination. When used with an overpack, container 1 would serve as a plastic liner and retaining ring 25 would be connected to the overpack in a conventional manner to aid in securing the plastic liner or container 1 in place. More precisely, the retaining ring extends beyond the overpack to support the plastic liner and prevent it from being forced farther into the overpack receptacle.

A closure plug 29 is shown at the very top of FIGURE 1. Closure plug 29 has threads 31 formed on the body portion 33 thereof. A cap portion 35 tops the threaded body portion 33. Threads 31 are adapted to engage threads 19 on inner surface 15 of neck ring 11. These respective threads are generally rather small and closely spaced so that threads 19 on neck ring 11 have to be accurately formed to properly engage threads 31 and provide a tight seal for container 1. When closure plug 29 is threaded into neck ring 11, cap portion 35 of closure plug 29 will seat against neck ring 11 when plug 29 is tightly screwed into neck ring 11. Thus, the threaded closure plug 29 will efficiently reseal container 1 each time that threads 19 and 31 are fully engaged.

In FIGURE 2, the individual elements discussed in connection with FIGURE 1 are shown in assembled form. Flange 5 of container 1 is received in an annular groove 37 formed in neck ring 11. The annular groove 37 is formed in body portion 13 of neck ring 11 and has an outer side 36 and an inner side 38. Preferably, groove 37 is centered in body portion 13. Groove 37 is provided with threads 39 on the outer side 36 thereof to engage threads 7 on the flange 5. During the assembly of neck ring 11 to flange 5, the groove 37 is united with flange 5 under relatively large torque and pressure so that a cold flow weld occurs. The cold flow weld is an interlocking transfer of plastic between the two elements without heating the plastic of either the flange or the neck ring to its melting point. Besides eliminating a heating step, this type of cold flow joint is easily obtained without disturbing the other characteristics of the elements involved. Thus, cold flow welding serves to interconnect the neck ring 11 and flange 5 to form a solid unitary construction. When combined with the mechanical interlocking produced by the engagement of threads 7 and 39 the cold flow weld causes the neck ring 11 to be securely fastened to flange 5.

To further reinforce the cold flow weld connection, another mechanical interlock is als outilized. This mechanical interlock may be of any type, but one specific type is illustrated in FIGURE 2 as the abutment of a shoulder 41 on flange 5 with a shoulder 43 on the inner side 38 of groove 37. Shoulders 41 and 43 are formed as tapered step surfaces.

Additional interlocking between neck ring 11 and container 1 is achieved by keyed interlock notches 23 and serrated edges 45. Keyed interlock notches 23 are placed about the bottom of the outer surface 17 of neck ring 11 at spaced intervals. By using a hot iron, some of the plastic from shoulder 9 may be melted and scraped into interlock notches 23, to form an additional bond. Serrated edges 45 are formed on the bottom of neck ring 11. Upon application of the neck ring to the flange these serrated edges 45 will be forced into shoulder 9 to form yet a further interlock.

As shown in FIGURE 2, groove 37 divides the body portion 13 of neck ring 11 into two separate sections throughout a large part of its vertical length. An outer section 47 is associated with outer surface 17 having threads 21, keyed interlock notches 23 and serrated edges 45. An inner section 49 of the body portion 13 of neck ring 11 is associated with the inner surface 15 having threads 19. Threads 19 engage threads 31 of the closure plug 29. As may be seen from the drawing, threads 19 and 31 are much smaller and must be much more accurately formed than threads 9 on flange 5. The harder injection molded plastic is greatly superior to the softer plastic formed by processes such as blow molding and rotation casting in providing the desired accuracy. With an accurate engagement of threads 31 and 19, and the seating of cap portion 35 of closure plug 29 on a gasket 52 (shown only in FIGURE 2), which is positioned between the cap portion 35 and the shoulder 51 of neck ring 11, an accurate and reproducible sealing is obtained by fully engaging threads 19 and 31.

A second embodiment of the subject invention is illustrated in FIGURE 3. This embodiment is primarily designed for packaging and shipping volatile liquids such as hydrogen peroxide. In this embodiment the neck ring 11' is the same as neck ring 11 in the embodiment of FIGURE 1 except for the addition of an annular projection 53 on the inner surface 15' of neck ring 11'. Projection 53 is formed below the threads 19' on the inner surface 15' of neck ring 11'. Projection 53 is designed to serve as a retaining member for a pair of diaphragm members 55 and 57.

Diaphragm members 55 and 57 include flexible diaphragms 59 and 61, respectively. Diaphragm 59 is provided with a vent 63, while diaphragm 61 is provided with a vent 65. Vents 63 and 65 are normally closed but when the flexible diaphragms are contorted, the vents are opened. Diaphragm members 55 and 57 have vertical support members 67 and 69 for diaphragms 63 and 65. Vertical support members 67 and 69 have lips 71 and 73, respectively, at the top thereof to be positioned on projection 53 on neck ring 11'. It will be noted that the vertical support member 67 has a considerably greater length than vertical support member 69, so that diaphragm 59 will be spaced below diaphragm 61 when the diaphragm members 55 and 57 are positioned on projection 53 (as viewed in FIGURE 4).

Closure plug 29' has the general shape of closure plug 29 but differs therefrom by having a cylindrical opening 75 extending through the center thereof. A dust cap 77 is arranged to be placed over closure plug 29' in a conventional manner.

FIGURE 4, which shows the assembled form of the FIGURE 3 embodiment, illustrates the placing of the various members of this embodiment. As in the FIGURE 1 embodiment, neck ring 11' is applied to flange 5' under relatively large torque and pressure to form a cold flow weld connection. In addition, the other interlocking arrangements are also utilized to assure that the neck ring 11' is securely connected to flange 5. The projection 53 formed on the inner surface 15' of neck ring 11' serves as a retaining member to hold the vertical support members 67 and 69 of diaphragm members 55 and 57, respectively. Diaphragm members 55 and 57 (and thus diaphragms 59 and 61) are positioned relative to each other in such a manner that the vents 63 and 65 are positioned diametrically opposite each other. This diametrically opposed positioning of vents 63 and 65 is to prevent the formation of a straight channel for the escape of the packaged liquid. Opening 75 in plug 29' leads outward from vent 65 to the dust cap 77. Dust cap 77 is provided with threads 79 which engage threads 21' of the neck ring 11' to secure the dust cap to the neck ring.

In the event of formation of gas from the volatile liquid (such as hydrogen peroxide) in the container, flexible diaphragms 59 and 61 will be contorted and the gas will escape through vents 63, 65, opening 75, and the inherent small openings between threads 79 and 21'. However, this will only occur if there is a sufficient quantity of gas present to create an undesired pressure situation.

During shipping the container often will be tipped over and even laid on its side to aid in moving the container. The double-diaphragm arrangement disclosed above effectively prevents the loss of any liquid during such displacement of the container (for a period of fifteen or twenty minutes). This prevention of liquid loss is achieved because the vent 65 will not be opened until the opening between diaphragms 59 and 61 is completely filled with liquid, and the liquid flow through vent 63 gives the desired time lag before any liquid escapes. Thus, the double-diaphragm arrangement provides for the escape of gas and yet effectively prevents a loss of liquid.

It should be understood that the embodiments described are merely exemplary of the preferred pratices of the present invention and that various changes, modifications, and variations may be made in the arrangements, operations, and details of construction of the elements disclosed therein, without departing from the spirit and scope of the present invention, as defined in the appended claims.

What is claimed is:
1. A closure arrangement for a container comprising:
an annular flange formed of plastic and located about an opening in the container;
an injection molded plastic neck ring comprising an annular member having a body portion, an inner surface, and an outer surface;
a groove formed in said body portion to lockingly mate with said flange and form a mechanical interlock between said neck ring and said flange, said groove being united with said flange under relatively large torque and pressure to form a cold flow weld, whereby said neck ring is securely joined to said flange by the combination of the mechanical interlock and the cold flow weld; and
means on the inner surface of said annular member to securely support a closure plug.

2. A closure arrangement as recited in claim 1 wherein:
said flange is provided with threads on the external surface thereof;
said groove has an inner side and an outer side, the outer side of said groove being threaded to engage the threads on said flange and mechanically interlock said neck ring and said flange; and
threads are formed on the inner surface of said annular member to engage the threads of a closure plug.

3. A closure arrangement as recited in claim 2 wherein the outer surface of said annular member of said neck ring is provided with threads to engage the threads of external closure and dispensing devices.

4. A closure arrangement as recited in claim 3 wherein the threads on the outer surface of said annular member engage the threads on a retaining ring which secures the container to an outer receptacle.

5. A closure arrangement as recited in claim 3 wherein said annular plastic flange is formed as an integral part of the container and located about an open end thereof, said flange positioned radially inwardly from the outer surface of the container by a shoulder portion.

6. A closure arrangement as recited in claim 5 wherein:
said groove divides a large part of the body portion of said annular member into two sections, a first section associated with the outer surface of said annular member and a second section associated with the inner surface of said annular member; and
said first section is provided with a serrated surface on the bottom thereof to engage the shoulder of the container to further increase the strength of the bond between the neck ring and the container.

7. A closure arrangement as recited in claim 6 and further comprising:
a plurality of notches formed at the bottom of said first section along said outer surface to provide keyed interlocks.

8. A closure arrangement for a container comprising:
an annular flange formed of plastic and located about an opening in the container;
an injection molded plastic neck ring comprising an annular member having a body portion, an inner surface, and an outer surface;
a groove formed in said body portion to lockingly mate with said flange and form a mechanical interlock between said neck ring and said flange, said groove being united with said flange under relatively large torque and pressure to form a cold flow weld, whereby said neck ring is securely joined to said flange by the combination of the mechanical interlock and the cold flow weld;
a pair of diaphrams with one diaphragm having a longer vertical support member than the other;
a projection formed on the inner surface of said annular member to provide a retaining member for both of said vertical support members;
a vent located in each diaphragm adjacent the edge thereof, said diaphragms located relative to each other in such a manner that the vent in one diaphragm is diametrically opposite the vent in the other diaphragm;
a closure plug having an opening therein to permit passage of gases escaping through said vents;
means on the inner surface of said annular member to support said plug;
a dust cap to prevent foreign material from being introduced into the container through the opening in said plug in said vents; and
means on the outer surface of said annular member to supoprt said dust cap.

9. A closure arrangement as recited in claim 8 wherein:
said flange is provided with threads on the external surface thereof;
said groove has an inner side and an outer side, the outer side of said groove being threaded to engage the threads on said flange;
said closure plug is externally threaded;
threads are formed on the inner surface of said annular member to engage the threads on said closure plug;
said dust cap is internally threaded; and
threads are formed on the outer surface of said annular member to engage the threads on said dust cap.

10. A threaded neck ring for a flanged opening of a container comprising:
an annular member injection molded from a plastic material and having a body portion, an inner surface, and an outer surface;
an annular groove having an inner side and an outer side formed in the body portion of said annular member, said annular groove provided with a spiral thread on the outer side thereof to engage a spiral thread formed on the outer surface of the flanged opening of the container;

the inner surface of said annular member provided with threads to engage the threads of a closure plug; and the outer surface of said annular member provided with threads to engage the threads of external closure and dispensing devices.

11. A threaded neck ring as recited in claim 10 wherein:

the inner side of said annular groove is provided with a tapered step surface for mechanically interlocking the neck ring to the flanged opening of the container.

12. A threaded neck ring as recited in claim 11 wherein:

said annular groove divides the body portion of said annular member into two sections, a first section associated with the outer surface of said annular member and a second section associated with the inner surface of said annular member;

said first section is provided with a serrated surface on the bottom thereof; and a plurality of notches are formed at the bottom of said first section along said outer surface.

References Cited
UNITED STATES PATENTS

| | | | |
|---|---|---|---|
| 3,086,679 | 4/1963 | Bijvoet | 220—39 X |
| 3,167,210 | 1/1965 | Carney | 220—39 X |

THERON E. CONDON, *Primary Examiner.*

G. T. HALL, *Assistant Examiner.*